UNITED STATES PATENT OFFICE.

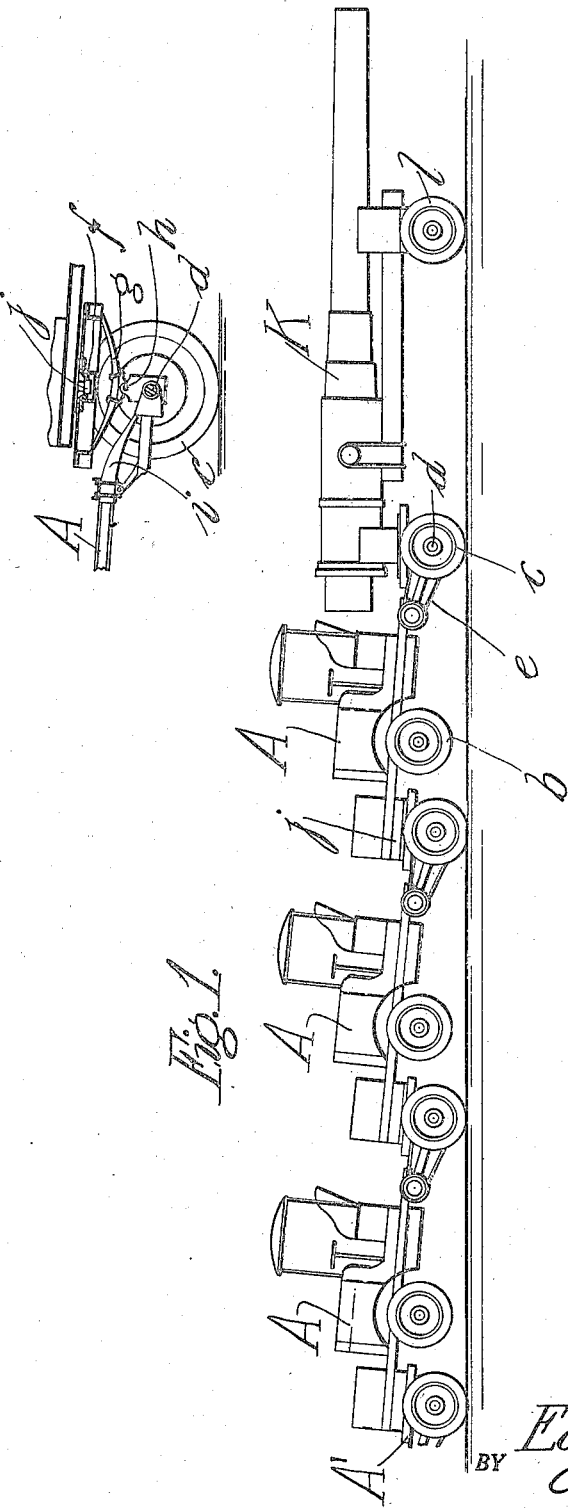

EDWARD O. SUTTON, OF SPRINGFIELD, MASSACHUSETTS.

TRACTOR.

1,264,576.

Specification of Letters Patent.

Patented Apr. 30, 1918.

Application filed July 16, 1917. Serial No. 180,782.

*To all whom it may concern:*

Be it known that I, EDWARD O. SUTTON, a citizen of the United States of America, residing at Springfield, in the county of Hampden and State of Massachusetts, have invented certain new and useful Improvements in Tractors, of which the following is a specification.

This invention relates to tractors and more particularly to a tractor adapted for coöperation with other tractors in the hauling of heavy loads.

According to one feature of the invention, the tractor is provided at one end with means whereby a following vehicle may be operably connected thereto for hauling, backing, and relative turning movements and at the other end with means, whereby the last-named end may be supported on an end of a preceding tractor to be operably backed, hauled, and steered thereby.

According to another feature of the invention, a series of tractors are operably connected one with another for operably hauling, backing, and steering relatively heavy loads, each tractor being supported at one end by its driving wheels and the other end of each except the leading tractor being supported upon the preceding tractor with its steering wheels in elevated position, whereby all the weight of all the tractors save part of the foremost tractor in the series is brought to bear on the driving wheels as a unit to obtain increased traction.

According to another feature of the invention, each tractor of the series is provided at its rear end with the lower part of a fifth wheel device arranged above the axle of the driving wheels, and at its forward end with the upper part of a fifth wheel device, whereby said upper part of one tractor may be supported on said lower part of another tractor with its steering wheels in elevated position. By this arrangement, each tractor will turn to follow the preceding tractor and the leading tractor, the steering wheels of which rest on the ground, will steer the entire series or train. The train as a whole will follow the leading tractor in the same manner as a linked chain follows when one end is drawn along a curved path.

Other features of the invention will appear in the illustrative embodiment of it in the accompanying drawing, in which—

Figure 1 is an elevation view showing a series of tractors connected in accordance with the invention for hauling a heavy load; and Fig. 2 is a fragmentary section view illustrative of the connection between the tractors or between a tractor and the load to be transported.

Referring to these drawings, A represents the tractor, $b$ the steering wheels, and $c$ the driving wheels thereof. The tractor may be of any suitable type and that shown herein is merely an illustrative example of one which is suitable for the present purposes. As illustrated, the driving wheels are arranged on a stationary or dead rear axle $d$ and are driven by a chain $e$ and suitable sprockets (not shown) in a manner well known in the art. Obviously, any other form of drive may be employed, as desired. At the rear of each tractor and preferably located with its center directly above the rear axle $d$ is the lower part of a suitable fifth wheel device, which is represented merely in conventional form by reference letter $f$. The device $f$ may be of any desirable construction and may be supported from axle $d$ in any suitable manner. Preferably, it is supported as indicated in Fig. 2 upon springs $g$ which have a pivotal connection $h$ with axle $d$ to permit a "fore and aft" rocking of the vehicle connected thereto as will appear. The rear end of the tractor, as shown, is supported independently of springs $g$ from axle $d$ by springs $i$, but may be otherwise supported as desired. The described construction is, however, preferred and for a more complete disclosure, reference is made to U. S. Letters Patent No. 1,018,248, granted February 20, 1912, to Charles H. Martin, which patent discloses the essential elements of the spring suspension described.

The forward end of each tractor is provided with a suitable extension which carries on its under side the upper part $j$ of a fifth wheel device to mate with the described lower part $f$ on the tractor. The device $f$ permits the tractor to be connected to haul, back, and steer a suitable trailer, which is provided with a part, corresponding to the part $j$ described, in the manner disclosed in the above-mentioned patent.

This invention is primarily concerned with the provision of the part $j$ on the forward end of the tractor which permits it to be operably connected with other similar tractors for coöperative action in the hauling of heavy loads, such as the cannon K illustrated in Fig. 1. The cannon is suitably supported at one end by wheels $l$ and at the other end bears a device $j$ which is adapted to mate with the part $f$ on a tractor A. The forward end of the latter is suitably raised, as by jacks, for example, and another tractor A is backed in under the described elevated end, whereupon the latter is lowered to bring the part $j$ on one into mating engagement with the part $f$ on the other, in a manner similar to that in which ordinary trailers are connected to a tractor. Other tractors are similarly connected one to another and to the described tractors until a sufficient number has been connected in series to haul the load K. The steering wheels $b$ of each tractor, except the leading one of the series are raised from the ground and the steering wheels of the leading tractor only remain upon the ground. The leading tractor is not shown as it may be exactly the same as the tractors illustrated except that its forward end is not in elevated position. An ordinary tractor without the part $j$ at its forward end may obviously be used as the leading tractor if desired.

Thus, a series of separately operable tractors may be connected one to another into a series, so that all may be generally steered by the foremost in the series and form a most effective traction train. It is also to be noted that the pivotal connection $h$ permits one vehicle to rock "fore and aft" with respect to another, as for example when the vehicles are traveling over rough roads or uneven ground.

An important advantage flows from connecting a series of tractors in the manner described for the connected series functions for all practical purpose as a single traction unit. This unit comprises as many pairs of driving wheels as there are tractors and only one set of effectively operable steering wheels. As distinguished from a single vehicle having a plurality of sets of driving wheels, the traction unit is flexible for convenient and effective steering, and it is flexible in another sense, namely, in that the number of traction wheels may be conveniently varied from a minimum sufficient for hauling light loads to as many as may be necessary for hauling heavy loads. The size of the unit may thus be varied as necessitated by the varying character of the load to be hauled.

It is to be noted that, with the ordinary tractor, the weight upon the driving wheels thereof necessary to obtain the desired tractive effort is generally obtained largely by supporting a part of the load to be hauled upon the driving wheels. A relatively small part only of the weight of the tractor itself bears upon its driving wheels. With the described arrangement, however, all the weight of all the tractors, except part of the weight of the leading tractor, is brought to bear upon the driving wheels as a unit for increased traction. The arrangement is, therefore, characterized by bringing into useful effect upon the driving wheels practically all that weight of the tractors, which has heretofore been ineffective for traction purposes, whereby a maximum of tractive effort may be obtained from a given number of tractors.

The invention has been described herein for illustrative purposes, but the scope of the invention is defined by the appended claims rather than by the foregoing description.

What I claim is—

1. A tractor having means at one end for connection to a trailing vehicle to support the forward end of the latter, and means at its other end for connection to another vehicle, whereby its own forward end may be supported with its steering wheels elevated by such other vehicle.

2. A tractor having driving and steering wheels, means adjacent the driving wheels for connection with a trailing vehicle, and an upper fifth wheel part adjacent the steering wheels, and constructed to support the steering end of the tractor with its steering wheels elevated upon a mating fifth wheel part of another tractor.

3. The combination with a tractor, of means at one end to support an end of another vehicle for operable hauling, backing, and relative turning movements with the tractor, and means at the other end of the tractor to support such end from an end of a second vehicle so that the tractor is connected for operable hauling and relative turning movements with the second vehicle.

4. The combination with a tractor having driving and steering wheels, of means adjacent the driving wheels to support one end of another vehicle for operable hauling and relative turning movements with the tractor, and means adjacent the other end of the tractor to support such end with the steering wheels elevated upon an end of a second vehicle for operable hauling and relative turning movements with the second vehicle.

5. The combination with a tractor having front steering and rear driving wheels, of means above the latter to support the fore end of another vehicle for operable hauling, backing, and relative turning movements with the tractor, and means to support the front end of the tractor from the rear end of another vehicle for operable hauling, backing, and relative turning movements with the last-named vehicle.

6. The combination with a tractor having rear and front wheels, of a lower fifth wheel device carried at one end of the tractor and an upper fifth wheel device carried at the other end of the tractor, all constructed and arranged so that a tractor train may be formed with increased traction for hauling heavy loads.

7. A series of tractors, one end of each being supported by its driving wheels and the other end of each except the foremost tractor of the series being supported from the rear of the preceding tractor for operable hauling, backing, and relative turning movements.

8. A series of tractors connected one to another for operable hauling and backing movements, each tractor having driving wheels to support one end thereof and steering wheels to support the other end when disconnected, the front end of each tractor except the first in the series being supported upon the preceding tractor with the steering wheels lifted out of supporting position, all constructed and arranged so that the first tractor steers the others of the series and so that all the weight of all the tractors except the first and part of the first is effective upon the driving wheels as a unit for increased traction.

9. A series of tractors, one end of each being supported by its driving wheels and the other end of each except the foremost tractor of the series being supported upon a preceding tractor to turn on a vertical axis, the latter being substantially in the same vertical plane as the axis of the driving wheels of the preceding tractor, the foremost tractor of the series having its other end supported by steering wheels, and arranged to steer the entire series of tractors.

10. A tractor having means at one end for connection to a trailing vehicle, and means at its other end for connection to another vehicle, whereby its own forward end may be supported with its steering wheels elevated by such other vehicle.

EDWARD O. SUTTON.